United States Patent
Zapinski

[19]

[11] Patent Number: 5,924,748
[45] Date of Patent: Jul. 20, 1999

[54] VISOR TORQUE CONTROL

[75] Inventor: Michael J. Zapinski, Troy, Mich.

[73] Assignee: Ut Automotive Dearborh, Inc., Dearborn, Mich.

[21] Appl. No.: 08/837,175

[22] Filed: Apr. 14, 1997

[51] Int. Cl.⁶ ........................................... B60J 3/00
[52] U.S. Cl. .................... 286/97.1; 296/97.1; 296/97.12; 296/97.13
[58] Field of Search ................................ 296/97.1, 97.12, 296/97.13

[56] References Cited

U.S. PATENT DOCUMENTS

| | | |
|---|---|---|
| 2,322,898 | 6/1943 | Van Dresser . |
| 4,390,202 | 6/1983 | Floweday et al. . |
| 4,394,043 | 7/1983 | Moulding et al. . |
| 4,500,131 | 2/1985 | Fleming . |
| 4,600,234 | 7/1986 | Jonsas ..................................... 296/97.1 |
| 4,828,313 | 5/1989 | Lanser et al. . |
| 4,921,300 | 5/1990 | Lawassani et al. . |
| 5,004,289 | 4/1991 | Lanser et al. ......................... 286/97.12 |
| 5,139,303 | 8/1992 | Miller ................................... 296/97.12 |
| 5,364,149 | 11/1994 | Aymerich et al. ................... 296/97.12 |
| 5,383,700 | 1/1995 | Agro et al. ............................ 296/97.12 |
| 5,409,285 | 4/1995 | Snyder et al. . |
| 5,556,155 | 9/1996 | Welter .................................. 296/97.12 |

FOREIGN PATENT DOCUMENTS

| | | |
|---|---|---|
| 2469307 | 3/1980 | France . |
| 2469307 | 5/1981 | France . |
| 3002124 | 7/1981 | Germany . |
| 3706568 | 9/1988 | Germany . |
| 1354485 | 5/1974 | United Kingdom . |
| 2086468 | 5/1982 | United Kingdom . |

*Primary Examiner*—D. Glenn Dayoan
*Assistant Examiner*—Kiran Patel
*Attorney, Agent, or Firm*—Howard & Howard

[57] ABSTRACT

A sun visor assembly includes a rod assembly and a visor body. The rod assembly includes a rod and a torque control. The rod includes a lobe and flats circumferentially spaced from one another. The torque control pivotally attached to the rod in an initial position. The visor body includes a channel. The channel extends partially longitudinally along the top edge of the visor body. The rod extends into the channel. The torque control includes a longitudinally extending flange and two spaced legs extending from the edge of the flange. Each leg has an upper curved portion and an lower curved portion joined by a first and second sidewall extending therebetween. The first and second sidewalls are substantially parallel. When the rod is disposed within each leg the lobe is between the legs. In operation, the torque control is designed so that the flats of the rod contact the first and second sidewalls in one position, the stored position.

8 Claims, 3 Drawing Sheets

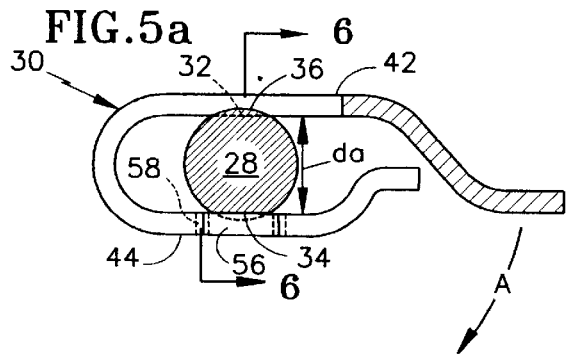
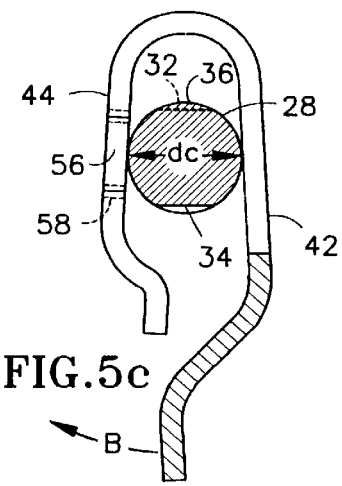
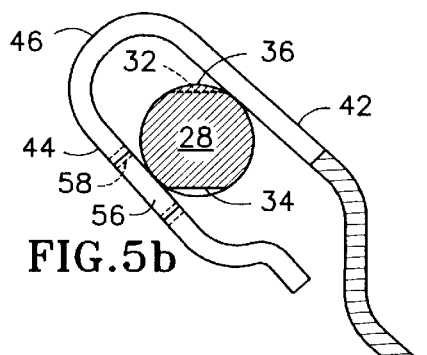
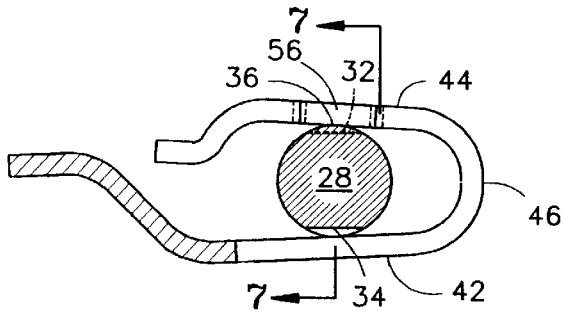
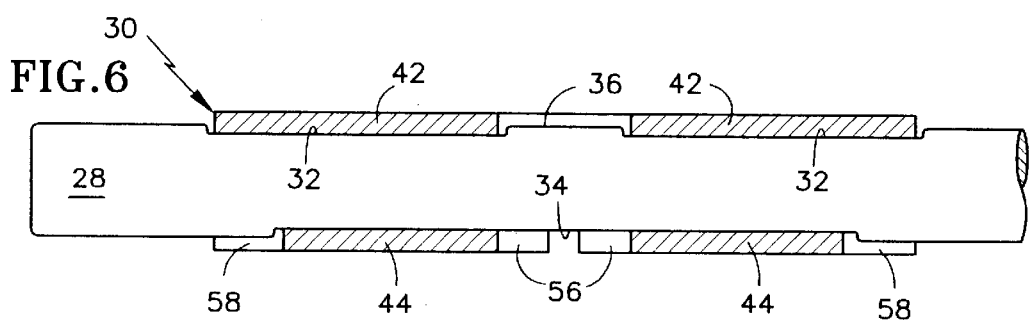
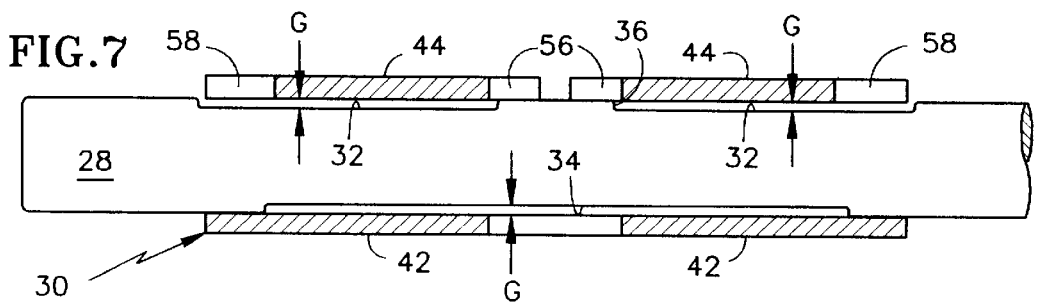

5,924,748

VISOR TORQUE CONTROL

TECHNICAL FIELD

The present invention relates to a visor, and more particularly to a torque control for attaching a visor to a pivot rod.

BACKGROUND OF THE INVENTION

The passenger compartments of vehicles are usually equipped with sun visors. The visors are mounted on pivot rods. The visors pivot downwardly from a stored position against the headliner of the vehicle to various lower positions for shielding the eyes of the occupants from sunlight. A torque control rotatably attaches the visor to the rod. The torque control must hold the visor at the various positions, yet permit relatively easy adjustment of the visor.

A number of current torque controls are formed so that the torque control curves about the pivot rod and the ends of the torque control are fixed. One problem with this configuration is that it is not durable. Since the ends are fixed when the visor body moves, stress concentrates at the curved portion of the torque control. Consequently, the control fails in that area before a predetermined cycle life is met. One way to attempt to increase the cycle life of this design is to hold the material processing within strict limits. This is undesirable since it increases the complexity and cost of manufacturing the part.

Therefore, a torque control is sought, which does not permit the visor to slip from the stored position to the lowered position during operation of the vehicle. It is also desired that the torque control be simple to manufacture, easy to assemble to the pivot rod, and robust.

SUMMARY

According to an embodiment of the present invention, a torque control for use with a sun visor is disclosed. The sun visor assembly includes a rod with a lobe formed thereon. The torque control includes a longitudinally extended flange and two legs extending from the edge of the flange. The legs are spaced apart. Each leg includes a substantially elliptical cross-sectional shape and a movable free end. The shape forms a channel through each leg. The rod is disposed through the channel in each leg so that the lobe is between each leg. Upon rotation of the torque control about the rod, the control holds the visor in various rotational positions with respect to the rod due to the camming action between the legs and the rod. In addition, the free end of each leg moves as the torque control rotates. The free end moves toward or away from the flange and allows the stress on the leg to be distributed so that a predetermined cycle life is attained.

In one embodiment, the rod further includes flats circumferentially spaced from one another. One of the legs further includes first and second sidewalls spaced from one another and parallel to the flange. Each leg also includes an extension longitudinally extending from the second sidewall, such that the flats of the rod contact the first and second sidewalls in one position, the stored position.

The foregoing invention will become more apparent in the following detailed description of the best mode for carrying out the invention and in the accompanying drawings.

BRIEF DESCRIPTION OF THE DRAWING

FIGS. 5a–d are cross-sectional views along line 5—5 of FIG. 1 of the torque control assembled to the rod with the torque control shown in stored, intermediate, lowered, and final positions, respectively.

FIG. 6 is a rear view along line 6 of FIG. 5a of the torque control in the stored position with portions broken away for clarity.

FIG. 7 is a front view along line 7 of FIG. 5d of the torque control in the final position with portions broken away for clarity.

BEST MODE FOR CARRYING OUT AN EMBODIMENT THE INVENTION

Figure 1:
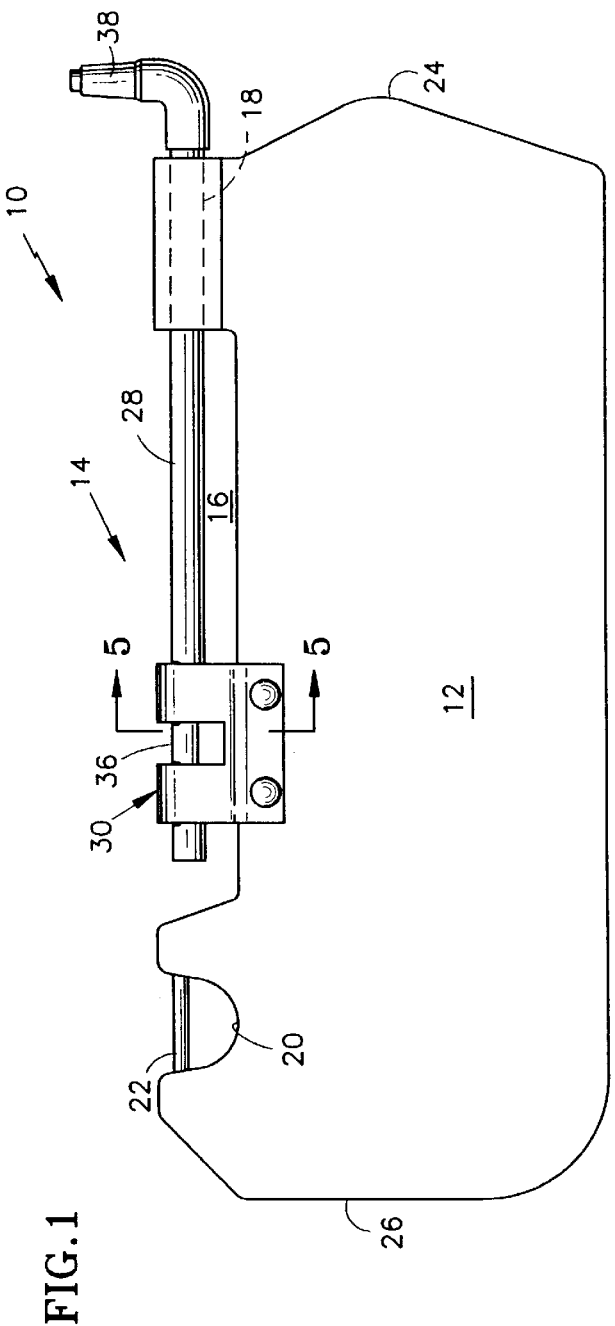
FIG. 1 is a front partial view of a visor assembly in a lowered, use position with a cover removed for clarity.

Referring to FIG. 1, a sun visor assembly 10 includes a visor body 12 and a pivot rod assembly 14. The visor body 12 can rotate between a number of positions. The visor body can be placed in a raised, stored position (as shown in FIG. 5a), where the visor is adjacent the headliner, and a lowered, variable use position (as shown in FIG. 1). The visor body 12 generally includes a channel 16, a bore 18, a cutout 20, and a pin 22.

The visor body 12 is substantially rectangular with the channel 16 longitudinally extending along a portion of the top edge of the visor body. When cloth or the like (not shown) is wrapped around the visor body the channel 16 is enclosed.

The bore 18 is extends longitudinally through the upper portion of the visor body between the channel 16 and the rear edge 24. During movement of the visor body between the stored and lowered positions the bore 18 act as a hinge.

The cutout 20 is U-shaped and formed within the top edge of the visor body 12 between the channel 16 and the front edge 26. The pin 22 extends longitudinally across the cutout 20.

The visor body and all of its components may be integrally injection molded from ABS plastic or other suitable plastics that have the appropriate properties for an automotive environment.

The pivot rod assembly 14 mounts the visor body 12 to the roof of the vehicle (not shown). Referring to FIG. 1, the pivot rod assembly 12 includes an elbow bracket (not shown), a L-shaped pivot rod 28, and a torque control 30. The elbow bracket attaches to the roof of the vehicle and pivotally secures one end of the rod 28 to the vehicle.

Figure 2:
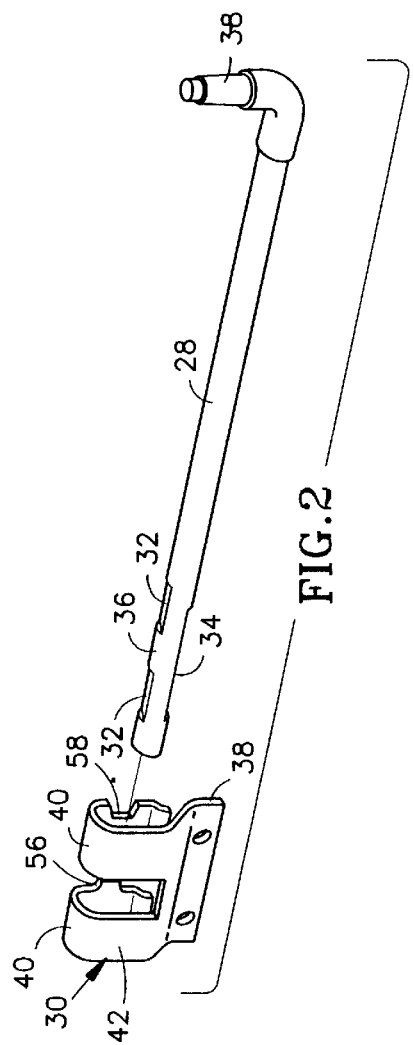
FIG. 2 is an exploded front perspective view of a torque control and a rod to which it is mounted.

Referring to FIG. 2, the pivot rod 28 includes two flats 32 and 34 coined into the solid cylindrical body. Flats 32 and 34 are spaced 180° apart from each other. The upper flat 32 is noncontinuous, being broken by a section of the rod that has not been flattened. Thus, a lobe 36 is formed between the flat segments 32. The lower flat 34 is continuous.

The rod 28 also includes a conical tower 38. The conical tower 38 allows the rod 28 to be snapped into the conventional elbow bracket.

Figure 3:
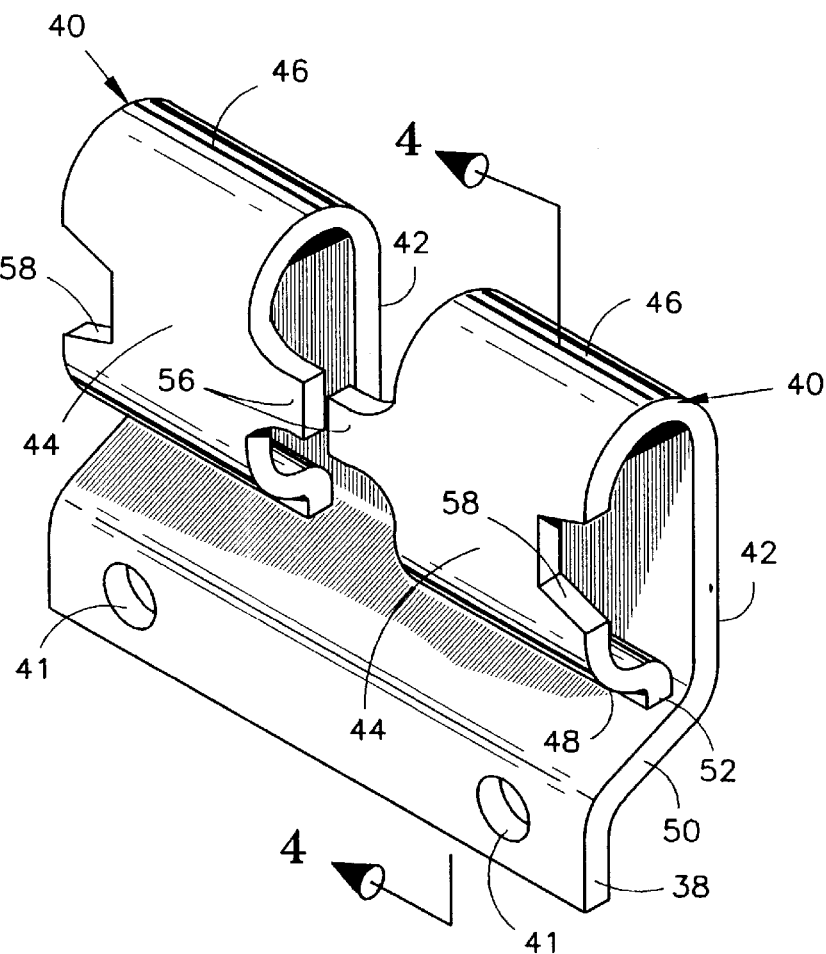
FIG. 3 is a rear perspective view of a preferred embodiment of the torque control of the present invention.

Referring to FIG. 3, the torque control 30 allows the visor body 12 to be moved between and held at various rotational positions with respect to the rod. The torque control 30 is piece of metal bent from a substantially U-shaped blank. In this embodiment, the torque control 30 is formed from spring steel using progressive or multi-slide dies.

The torque control 30 includes a flange 38 and two legs 40. The flange 38 is longitudinally extending and has two spaced holes 41 The two legs 40 are spaced apart from one another and extend from the edge of the flange 38 at opposite ends thereof Referring to FIG. 4, each of the legs 40 has a substantially elliptical cross-sectional shape. The cross-sectional shape includes a first sidewall 42, a second side wall 44, an upper concave portion 46, a lower concave portion 48, an angled portion 50, and end portion 52. The first and second sidewalls 42 and 44 are substantially parallel to the flange 38 and spaced from one another. The upper portion 46 is curved and connects the first and second sidewalls. The lower portion 48 is curved toward the first sidewall 42.

The angled portion 50 extends outwardly at an angle from the flange 38 to the first sidewall 42. The end portion 52 extends from the free end of the lower curved portion 48. The end portion 52 is substantially parallel to the flange 38. The free end of the end portion 52 is spaced from the angled portion 50 leaving a gap represented by the arrow g.

In other embodiments, the angled portion 50 and the end portion 52 may be eliminated and the design of the control modified in order to be used with different visor body geometries.

A channel 54 is formed through each elliptical leg, between the first and second sidewalls. The distance between these sidewalls is represented by the arrow d.

Figure 4:
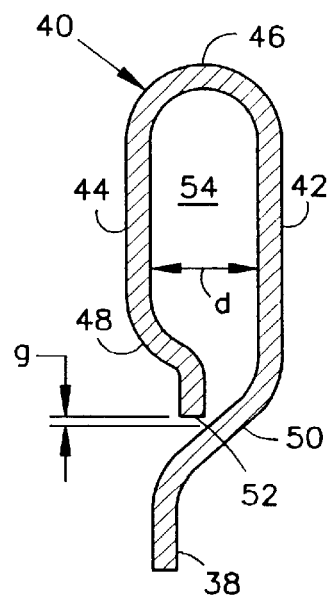
FIG. 4 is a cross-sectional view along line 4—4 of FIG. 3 of the torque control without the rod in the lowered, use position.

Referring to FIGS. 3 and 4, the second sidewall 44 of each leg 40 includes an extension 56 longitudinally extending from the inner edges of each second sidewall 44. The extensions 56 extend between the legs 40. Each second sidewall 44 also includes a cutout 58 extending inwardly from the outer edges of each second sidewall 44.

The torque control 30 is cut from a sheet of SAE 1070 or 1095 spring steel with a thickness of from 0.9 to 1.1 mm, and bent to the desired shape. The material is heat treated a Rockwell hardness of from 47 to 49. The dimensions of the features are experimentally determined and depend on the predetermined visor system thickness, the rod's dimensions, the material used, and the force requirements. A conventional lubricant should be used. The lubricant should work at high and low temperatures.

Assembly of the rod to the torque control will now be discussed with reference to FIGS. 1 and 2. The rod 28 is passed through the channels 54 (as shown in FIG. 4) of the torque control 30 until the lobe 36 is between the legs 40 within the cutout. This prevents the torque control 30 from moving longitudinally on the rod 28. The rod 28 is placed into the visor body bore 18. Thus, the rod 28 extends into the channel 16. The torque control is attached to the visor body 12 using the holes 41 and conventional fasteners, such as rivets.

Use of the visor body assembly 10 will now be discussed. Referring to FIG. 2, during the entire rotation of the torque control 30, the lobe 36 is between the legs 40. Referring to FIGS. 5a and 6, while in the stored position, the first and second sidewalls 42 and 44 are in contact with the flats 32 and 34. The distance between the flats, represented by the arrow da, is greater than the distance d (as shown in FIG. 4). Thus, the rod 28 is under the clamping pressure of the torque control 30. The lobe 36 (as shown in FIG. 2) is between the legs 40, adjacent the first sidewall 42.

Referring to FIGS. 1, 5a, 5b, and 5c, the torque control 30 and visor body 12 are lowered into the lowered, use position.

This movement is represented by the arrow A. The force required to move the control 30 out of the stored position is large enough to retain the visor in the stored position during vehicle operation. During this movement the first and second sidewalls 42 and 44 are initially resiliently separated by the camming action of the pivot rod 28. The camming action occurs when the control moves from contact with the flats of the rod to the curved portion of the rod.

Referring to FIG. 5c, thereafter in the lowered, use position, the first and second sidewalls 42 and 44 are resiliently separated a distance, represented by the arrow dc, due to the width of the rod 28. The distance dc is greater than da, thus the clamping force is greater in this position. The force required to moved the visor between the intermediate, lowered, and the final positions is small enough that the visor can be moved easily.

Referring to FIGS. 5c, 5d, and 7 when the visor is rotated further clockwise, as represented by the arrow B. In the final position, the visor and torque control are 180° from the stored position. The extensions 56 contact the lobe 36 to allow a gap G between the first and second sidewalls 42 and 44 and the flats 32 and 34. This interface prevents the camming action from occurring during this movement, and thus the snap-up motion does not to occur during this movement. As a result, the visor will be retained in any intermediate position between the final and lowered positions.

As the visor is rotated counter clockwise from the lowered position (as shown in FIG. 5c) toward the stored position, the camming action occurs creating a rotational torque which snaps the visor up into the stored position. The point at which the torque control snaps the visor up is predetermined by the particular vehicle's environment.

The principal advantage of the torque control is a light weight and easily manufactured single piece which provides for easy assembly to the rod. The control can be used with various visors. The control causes the visor to be snapped up into the stored position, but does not cause snap up into the final position. Furthermore, since the free end of each leg is movable and moves during use, the stress during movement is less concentrated at the upper curved portion 46 thus the design meets the predetermined cycle life requirements.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. These modifications include, but are not limited to, number of legs and cutouts and consequently number of lobes/flats. The torque control may also be modified so that the cutout covers less of the length of the legs. The legs may also be joined at their free ends.

It is therefore contemplated that the appended claims will cover any such modification or embodiments that fall within the true scope of the invention.

I claim:

1. A sun visor assembly comprising:
   a rod with a lobe formed thereon;
   a torque control member for resiliently engaging said rod and having a longitudinally extending flange for attaching said torque control assembly to a visor body; and
   two spaced legs extending from the edge of said flange; each of said legs further includes
      a substantially elliptical cross-sectional shape forming a channel therethrough; upon disposing the rod through said channel in each leg the lobe is disposed between said legs; and a movable free end; upon rotation of said torque control member about the rod said torque control member holds the visor in various rotational positions with respect to the rod, and said free end moves as said legs interact with said lobe as said torque control member is rotated.

2. A torque control assembly for use with a sun visor assembly comprising:

a rod with a lobe formed thereon and a noncontinuous flat having the lobe therebetween and a continuous flat on the opposite side of the rod from the noncontinuous flat;

a torque control member having a longitudinally extending flange for attaching said torque control assembly to the visor and two spaced legs extending from the edge of said flange, said torque control member for holding the visor in various rotational positions with respect to the rod, including a stored position and a lowered position, wherein each of said legs further includes a substantially elliptical cross-sectional shape forming a channel therethrough; upon disposing the rod through said channel in each leg the lobe is disposed between said legs; said elliptical cross-sectional shape further including two spaced sidewalls; said sidewalls being substantially parallel to said flange; said sidewalls contacting the noncontinuous flat and the continuous flat only in the stored position; and a movable free end extending from one of said sidewalls such that upon rotation of said torque control member about the rod said free end moves with respect to said other sidewall.

3. The torque control of claim 2, wherein each leg further includes an extension extending longitudinally from the inner edges of one of said sidewalls.

4. The torque control of claim 2, wherein each of said legs further includes a cutout extending inwardly from the outer edges of one of said sidewalls.

5. A torque control assembly for use with a sun visor assembly comprising:

a rod with one noncontinuous flat with a lobe formed therebetween on one surface, and a continuous flat on an opposite surface;

a torque control member having a longitudinally extending flange for attaching the torque control assembly to the visor; and two spaced legs extending from the edge of said flange, each of said legs further includes a substantially elliptical cross-sectional shape forming a channel therethrough; upon disposing the rod through the channel in each leg the lobe is disposed between said legs; said elliptical cross-sectional shape further includes two spaced sidewalls; said sidewalls being substantially parallel to said flange; one of said sidewalls further includes an extension extending longitudinally from the inner edges thereof and a cutout extending inwardly from the outer edges thereof, and a movable free end; upon insertion of the rod through said channels, said sidewalls contact the noncontinuous flat and the continuous flat only in a stored position, such that upon rotation of said torque control member about the rod said free end of said torque control member moves, and said torque control member holds the visor in various rotational positions with respect to the rod.

6. A torque control assembly for use with a sun visor assembly comprising:

a rod with one noncontinuous flat with a lobe formed therebetween on one surface, and a continuous flat on an opposite surface;

a torque control member having a longitudinally extending flange for attaching said torque control assembly to the visor; and a leg extending from the edge of said flange forming a channel through which the rod extends, and including two spaced sidewalls; said sidewalls being substantially parallel to said flange; one of said sidewalls further including at least one extension longitudinally extending therefrom such that the lobe cooperates with said extension and allows the flats to engage said sidewalls only in a stored position; and a movable free end extending from one of said sidewalls, upon rotation of said torque control member about the rod said torque control member holds the visor in various rotational positions with respect to the rod, said free end moves with respect to said other sidewall as said torque control member is rotated.

7. A visor rod assembly for supporting a sun visor, said visor rod assembly comprising:

a rod with one noncontinuous flat with a lobe formed therebetween on one surface, and a continuous flat on an opposite surface; and a torque control for holding the visor in various rotational positions with respect to said rod, said torque control comprising a longitudinally extending flange for attaching said torque control to the visor; and two spaced legs extending from the edge of said flange; each of said legs further includes a substantially elliptical cross-sectional shape forming a channel therethrough; upon disposing said rod through the channel in each leg said lobe is disposed between said legs; said elliptical cross-sectional shape further includes two spaced sidewalls, said sidewalls being substantially parallel to said flange; one of the sidewalls further includes an extension extending longitudinally from the inner edges thereof and a cutout extending inwardly from the outer edges thereof, and a movable free end; upon insertion of said rod through the channels said sidewalls contact said noncontinuous flat and said continuous flat only in a stored position, such that upon rotation of said torque control about said rod said free end of said torque control moves.

8. A sun visor assembly comprising:

a visor body; and a rod assembly including a rod with one noncontinuous flat with a lobe formed therebetween on one surface, and a continuous flat on an opposite surface; and a torque control for holding the visor in various rotational positions with respect to said rod, said torque control comprising a longitudinally extending flange for attaching said torque control to said visor body; and two spaced legs extending from the edge of said flange; each of said legs further includes
a substantially elliptical cross-sectional shape forming a channel therethrough; upon disposing said rod through the channel in each leg said lobe is disposed between said legs; said elliptical cross-sectional shape further includes
two spaced sidewalls; said sidewalls being substantially parallel to said flange; one of the sidewalls further includes an extension extending longitudinally from the inner edges thereof and a cutout extending inwardly from the outer edges thereof; and
a movable free end; upon insertion of said rod through the channels said sidewalls contact said noncontinuous flat and said continuous flat only in a stored position such that upon rotation of said torque control about said rod said free end of said torque control moves.

* * * * *